United States Patent [19]

Nakamura et al.

[11] Patent Number: 4,713,044
[45] Date of Patent: Dec. 15, 1987

[54] BELT TENSIONER UNIT FOR INTERNAL COMBUSTION ENGINE OR THE LIKE

[75] Inventors: Makoto Nakamura, Yokohama; Mitsuru Takahashi, Yamato; Namieki Osawa; Yuichi Murakami, both of Yokohama, all of Japan

[73] Assignee: Nissan Motor Co., Ltd., Yokohama, Japan

[21] Appl. No.: 904,293

[22] Filed: Sep. 8, 1986

[30] Foreign Application Priority Data

Sep. 9, 1985 [JP] Japan ............................. 60-137660[U]

[51] Int. Cl.[4] .............................................. F16H 7/12
[52] U.S. Cl. ................................................... 474/135
[58] Field of Search ............................... 474/101–103, 474/109–111, 133, 135; 305/10; 267/34

[56] References Cited

FOREIGN PATENT DOCUMENTS

| | | | |
|---|---|---|---|
| 0512036 | 10/1952 | Belgium | 474/135 |
| 1081876 | 12/1954 | France | 474/135 |
| 58-121344 | 7/1983 | Japan | |
| 0208251 | 11/1984 | Japan | 474/135 |
| 83/02308 | 7/1983 | PCT Int'l Appl. | 474/135 |

*Primary Examiner*—Stephen J. Novosad
*Assistant Examiner*—Thuy M. Bui
*Attorney, Agent, or Firm*—Schwartz, Jeffery, Schwaab, Mack, Blummenthal & Evans

[57] ABSTRACT

The arm on which the idler pulley is supported as well as the tensioner which biases the arm to tension a timing belt or the like are both mounted on a common base plate. The plate is pivotally supported on the engine block and selectively secureable in a desired position. A stopper mechanism which can be used to temporarily disable the biasing and damping functions of the tensioner enables automatic tension setting.

8 Claims, 4 Drawing Figures

BELT TENSIONER UNIT FOR INTERNAL COMBUSTION ENGINE OR THE LIKE

BACKGROUND OF THE INVENTION

1. Field of the Invention

The present invention relates generally to a belt tensioning device and more specifically to a belt tensioning unit which can be readily mounted on a variety of different internal combustion engines or the like devices.

2. Description of the Prior Art

FIGS. 1 and 2 of the drawings show a previously proposed arrangement disclosed in Japanese Patent Application First Provisional Publication No. 58-121344 published on July 19, 1983. As shown, this arrangement is mounted on an engine cylinder block 1 and arranged to tension a so called "timing belt" 2 which operatively interconnects a cam shaft pulley 3 with a pulley 4 connected to one end of the engine crankshaft. The tensioning arrangement includes an idler pulley 5 which is rotatably mounted on an arm 6 which is pivotal about a support pivot or pin 7. A tensioner mechansim 8 is mounted on the cylinder block 1 independently of the arm 6. This mechanism includes a hollow piston 9 reciprocatively disposed in a cylinderical housing 10, a compression spring 11 which biases the piston 9 toward the arm 6 and a damper arrangement which includes a inner piston like element 12 which is abutted by spring 11. A stud 13 mounted on the arm abuts a shaped concavity formed on the outboard end of the hollow piston 9.

This arrangement has suffered from the drawback in that, as (a) the length of the timing belt, the position and diameter of the pulleys connected by the timing belt all tend to vary from one type of engine to another and (b) the arm and the tensioner are independently mounted on the engine block, considerable care must be exercised to ensure that tensioner 8 is correctly positioned with respect to the arm 6 and that the tensioner 8 exerts the appropriate force on the arm. This of course requires careful manual manipulation. The care that must be excercised when this operation is carried out is increased by the fact that the bolt holes 14 formed in the mounting brackets 15 formed on the cylindrical housing 10 are circular and do not permit ready angular adjustment of the device.

SUMMARY OF THE INVENTION

It is an object of the present invention to provide a belt tensioning arrangement which can be readily mounted on a variety of different types of internal combustion engine (for example) with the minimum amount of trouble.

In brief, the above object is achieved by an arrangement wherein the arm on which the idler pulley is supported as well as the tensioner which biases the arm to tension a timing belt or the like, are both mounted on a common base plate. The plate is pivotally supported on the engine block and selectively secureable in a desired position. A stopper mechanism which can be used to temporarily disable the biasing and damping functions of the tensioner enables automatic tension setting.

More specifically, the present invention takes the form of a belt tensioning arrangement for a device having a belt which drivingly interconnects pulleys, and which comprises a base plate pivotally mounted on said device and selectively securable in a selected position; a support arm pivotally mounted on said base plate; an idler pulley mounted on said support arm, said idler pulley being engageable with said timing belt; and a tensioner mechanism mounted on said base plate, said tensioner mechanism including means for biasing said support arm in a first rotational direction which increases the force with which said pulley engages said timing belt and thus increases the tension therein.

DETAILED DESCRIPTION OF THE PREFERRED EMBODIMENTS

Figure 1:
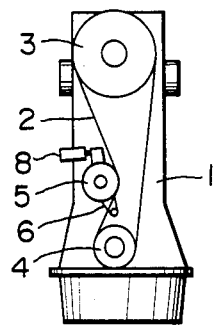
FIGS. 1 and 2 are front elevations of the prior art arrangement discussed in the opening paragraphs of the instant disclosure.
Figure 2:
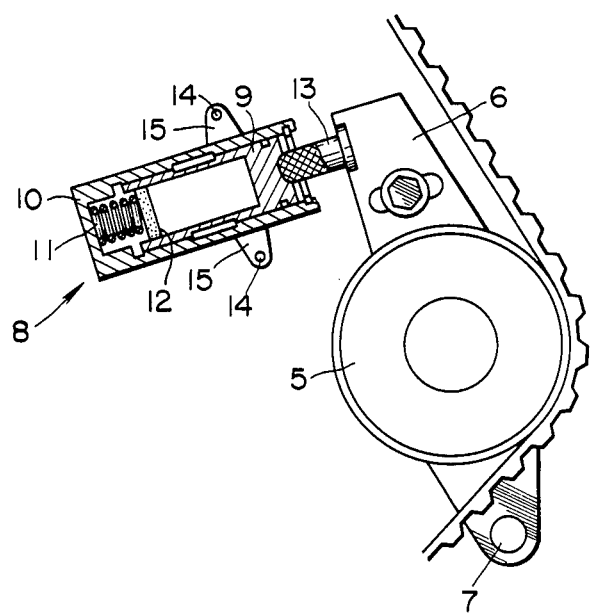
Figure 3:
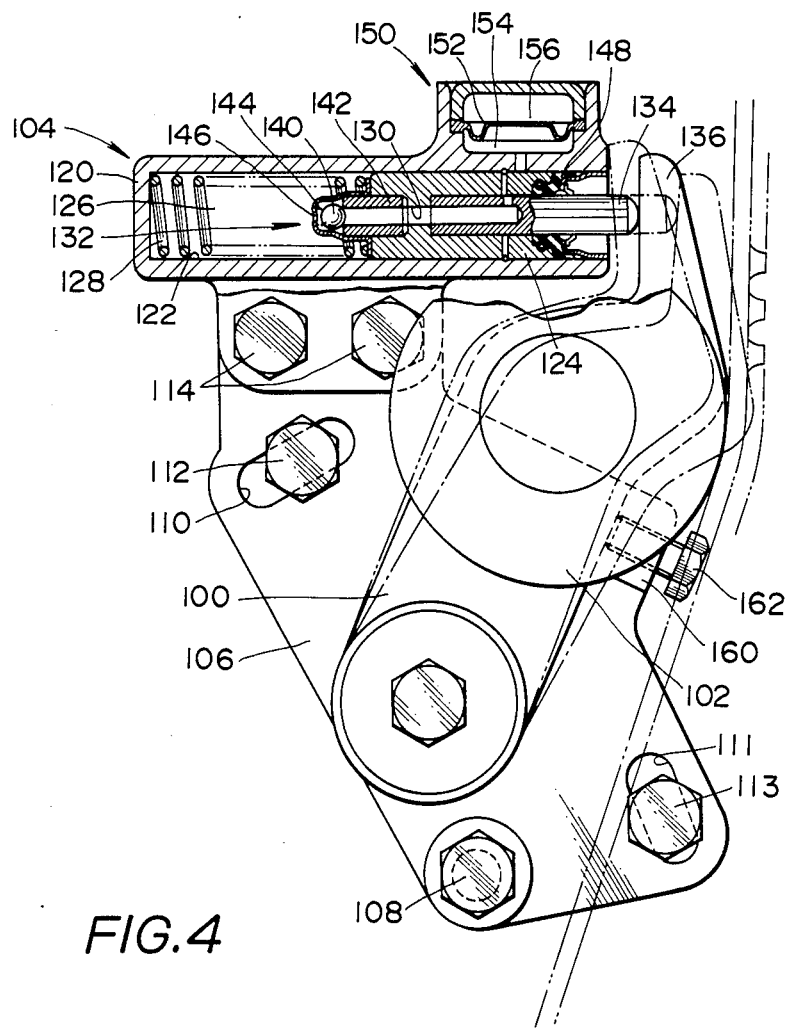
FIG. 3 is a front elevation of an embodiment of the present invention.
Figure 4:
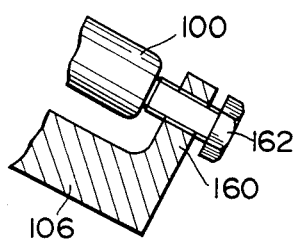
FIG. 4 is a plan view of a section of the arrangement shown in FIG. 3 showing a stopper which forms part thereof.

FIGS. 2 and 3 show an embodiment of the present invention. In this arrangement both the pivotal support arm 100 on which the idler pulley 102 is mounted and the tensioner mechanism 104 which applies a bias to the arm 100 are mounted on a base plate 106. This latter mentioned element (#106) is arranged to be pivotal about a first mounting bolt or pin 108 and to have two elongate openings 110, 111 in which second and third mounting bolts 112, 113 are received. The openings are arranged so that the base plate 106 can be pivotted through a limited angle and secured in a desired position by tightening of bolts 112, 113.

The tensioner mechanism 104 is detachably secured by way of bolts 114 to an end of the base plate 106 distal from the axis about which the support arm 100 is pivotal. In this embodiment the tensioner mechanism 104 includes a housing 120 in which an elongate blind bore 122 is formed. A first piston 124 is reciprocatively disposed in the bore in a manner to define a variable volume chamber 126 therein. A compression spring 128 is disposed in this chamber and arranged to engage the inboard end of piston 124 and bias the same in a direction which tends to increase the volume of said chamber 126. Chamber 126 is filled with a high viscosity oil or the like.

Piston 124 is formed with a stepped axial bore 130. A one-way check valve arrangement 132 is arranged to control communication between chamber 126 and the stepped bore 130 while a second piston 134 is reciprocatively disposed in the outboard larger diameter section of the bore 130. This second piston 134 has a rounded tip which engages a tang-like projection 136 formed on the free end of the idler pulley support arm 100. The one-way check valve arrangement 132 includes a ball 140 which is biased against the mouth of a bore (no numeral) formed in a grub screw-like element 142 threadably received in the inboard end of the first piston 124, by a small spring 144. The spring 144 and ball 140 are retained in a cage 146 secured to element 142.

An oil seal 148 is disposed in mouth of bore in a manner to permit reciprocal movement of both pistons 124, 134 while providing a hermetic seal which prevents loss of oil from the device.

A reservoir 150 is formed on the side of the housing 120. As shown this reservoir includes a diaphragm 152 which hermetically divides an oil storage chamber 154 from an atmospheric pressure air space or chamber 156.

The oil storage chamber 154 is selectively communicable with chamber via the one-way check valve 132 and a passage structure which includes a radial bore formed in the first piston 124, a radial bore and axial blind bore formed in the second piston 134.

The base plate 106 is formed with a flange like portion 160 which extends essentially normally to the major surface thereof. A stopper which in this embodiment takes the form of a bolt 162 is threadedly received in a tapped through hole formed in the flange. Rotation of bolt 162 permits the rotation of the idler pulley support arm 100 in the clockwise direction (as seen in FIG. 3) to be limited. This stopper arrangement although highly advantageous is not essential to the normal operation of the tensioner and may be omitted if so desired.

The above disclosed tensioning arrangement (viz., one including a stopper arrangement) may be mounted on an engine block or the like using the following procedure. First stopper bolt 162 is rotated until the idler pulley support arm 100 is forced in the counter-clockwise direction (as seen in FIG. 3) until pistons 124, 134 are driven into bore 122 against the bias of spring 128, in chamber 126 oil is compressed and functions as a quasi solid body and any damping function of the tension mechanism 104 is prevented. Subsequently, the unit is then pivotally mounted on the engine block via bolt 108. Following this, the unit is rotated until the idler pulley 102 engages the timing belt and produces a small amount of tension therein. Bolts 112, 113 are then tightened to secure the base plate 106 in position and stopper bolt 162 is rotated in manner which withdraws the same and releases arm 100 permitting the latter to rotate in the clockwise direction under the influence of the tensioner mechanism 104. This rotation automatically tensions the timing belt to the intended level without the need for further time consuming adjustment work.

In the event that the stopper bolt 162 is omitted, manual setting of the timing belt tension followed securing bolts is all that is necessary.

During operation of the device the periodic tension fluctuations which tend to occur in the belt (due to changes in temperature, torque etc.,) are compensated for by the damping function of the tensioner mechanism 104. Viz., when the tension in the belt drops pistons 124, 134 are permitted to move toward the open end of bore 122 under the influence of spring 128. At this time the one-way check valve 132 opens and additional oil can be inducted into chamber 126 from the reservoir 150 increasing the volume contained therein and thus limiting the amount by which the first piston 124 may be moved back into bore against the bias of spring 128.

What is claimed is:

1. In a device having a belt which drivingly interconnects pulleys, a belt tensioning arrangement comprising:
   a base plate pivotally mounted on said device and selectively securable in a selected position;
   a support arm having first and second ends, said support arm being pivotally mounted on said base plate at a first end thereof so as to be pivotal about an axis;
   an idler pulley mounted on said support arm at a location between said first and second ends, said idler pulley being engageable with said timing belt; and
   a tensioner mechanism mounted on said base plate at a location distal from said axis, said tensioner mechanism including means for applying a bias to said second end of said support arm which biases said support arm in a first rotational direction which increases the force with which said pulley engages said timing belt and thus increases the tension therein.

2. A tensioning arrangement as claimed in claim 1, wherein said tensioner mechanism comprises:
   a housing in which a bore is formed;
   a first piston reciprocatively disposed in said bore in a manner to define a variable volume chamber, said variable volume chamber being filled with oil;
   a second piston reciprocatively disposed in an axis bore formed in said first piston, said second piston having a end engageable with said support arm;
   biasing means disposed in said variable volume chamber for biasing said first piston in a first axial direction;
   a reservoir in which oil is stored;
   a passage structure formed in said housing, first and second pistons, said passage structure being arranged to selectively establish fluid communication between said reservoir and said variable volume chamber; and
   a one-way check valve, said one-way check valve being disposed in said passage structure and arranged to permit oil from said reservoir to enter said variable volume chamber.

3. A tensioning arrangement as claimed in claim 2, wherein said housing is detachably secured to said base plate.

4. A tensioning arrangement as claimed in claim 2, wherein said reservoir comprises:
   a diaphragm which hermetically divides an oil storage chamber and an atmospheric pressure chamber.

5. A tensioning arrangement as claimed in claim 2, further comprising an oil seal disposed in said bore, said oil seal permitting reciprocative motion of said first and second pistons.

6. A tensioning arrangement as claimed in claim 1, further comprising a stopper, said stopper being selectively adjustable in a manner to prevent said tensioner mechanism from applying a bias to said support arm while said base plate is being selectively secured to said device.

7. A tensioning arrangement as claimed in claim 1, wherein said base plate includes a first aperture in which a pivot pin is received and second and third elongate apertures which are constructed and arranged to permit said base plate to be rotated by a limited amount about the axis of said pivot pin and to receive bolts which may be selectively tightened to secure said base plate in a selected position.

8. In a device having a belt which drivingly interconnects pulleys, a belt tensioning arrangement comprising:
   a base plate, said base plate being mounted on said device so as to be pivotal about a first axis and including means for selectively securing said base plate in a preselected position;
   a housing mounted on said base plate at a location distal from said axis;
   a support arm having first and second ends, said support arm being mounted at said first end on said base plate so as to be pivotal about a second axis, said second axis being essentially parallel with said first axis and located between said first axis and said housing;
   an idler pulley rotatably mounted on said support arm at a location intermediate of said first and second ends, said idler pulley being arranged to engage said belt;
a piston reciprocatively disposed in said housing, said piston being arranged to abut said support arm at a location proximate said second end and between said second end and a third axis about which said idler pulley is rotatable, said piston being able to apply a bias which tends to cause said support arm to rotate in a rotational direction which increases the tension in said belt.

* * * * *